(12) United States Patent
Yoshida et al.

(10) Patent No.: US 11,171,510 B2
(45) Date of Patent: Nov. 9, 2021

(54) POWER WIRING DEVICE

(71) Applicant: ZEON CORPORATION, Tokyo (JP)

(72) Inventors: Masayoshi Yoshida, Tokyo (JP); Kiyoshige Kojima, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 16/769,582

(22) PCT Filed: Nov. 8, 2018

(86) PCT No.: PCT/JP2018/041540
§ 371 (c)(1),
(2) Date: Jun. 4, 2020

(87) PCT Pub. No.: WO2019/123880
PCT Pub. Date: Jun. 27, 2019

(65) Prior Publication Data
US 2021/0167628 A1 Jun. 3, 2021

(30) Foreign Application Priority Data
Dec. 19, 2017 (JP) .............................. JP2017-243246

(51) Int. Cl.
H02J 50/00 (2016.01)
H02S 40/36 (2014.01)
H02J 7/00 (2006.01)

(52) U.S. Cl.
CPC .......... *H02J 50/001* (2020.01); *H02J 7/0068* (2013.01); *H02S 40/36* (2014.12)

(58) Field of Classification Search
CPC ........ H02J 7/00; H02J 7/20; H02J 7/34; H02J 7/35; H02J 7/0047; H02J 7/0052;
(Continued)

(56) References Cited

U.S. PATENT DOCUMENTS 6,894,460 B2 * 5/2005 Clingman .............. H02N 2/181
310/311
8,633,619 B2 * 1/2014 Robinson .............. H02J 7/0021
307/115
(Continued)

FOREIGN PATENT DOCUMENTS

EP 1039361 A1 9/2000
JP S5636144 Y2 8/1981

OTHER PUBLICATIONS

Jun. 23, 2020, International Preliminary Report on Patentability issued in the International Patent Application No. PCT/JP2018/041540.
(Continued)

*Primary Examiner* — Nguyen Tran
*Assistant Examiner* — Jagdeep S Dhillon
(74) *Attorney, Agent, or Firm* — Kenja IP Law PC

(57) ABSTRACT

Provided is a power wiring device that can suppress reduction of electricity generation efficiency due to the external environment. The power wiring device includes: a plurality of circuit modules each including a first connector and a second connector; and a wiring member including a third connector that is mechanically and electrically attachable to and detachable from the first connector and a fourth connector that is mechanically and electrically attachable to and detachable from the second connector, and in which the third connector and the fourth connector are electrically connected to one another. The plurality of circuit modules includes: an energy harvesting module as a circuit module that can output, from the first connector and the second connector, electric power obtained through energy harvesting; and a load module as a circuit module that can consume electric power input from the first connector and electric power input from the second connector.

11 Claims, 9 Drawing Sheets

(58) Field of Classification Search
CPC .... H02J 47/00; H02J 3/38; H02J 3/383; H02J 3/385; H02J 3/381; H02J 3/04; H01M 10/46; H05K 13/00; H05K 7/2039; H02M 7/44
USPC ............... 307/19, 21, 64, 66, 82, 10.1, 80
See application file for complete search history.

(56) References Cited

U.S. PATENT DOCUMENTS

| | | | | |
|---|---|---|---|---|
| 2009/0179627 A1* | 7/2009 | Innami | ............ | H02J 7/345 323/318 |
| 2010/0311262 A1 | 12/2010 | Cours et al. | | |
| 2011/0138609 A1* | 6/2011 | Cherukupalli | ...... | H01L 31/1876 29/592.1 |
| 2012/0206110 A1* | 8/2012 | Nishida | ......... | H02J 7/0034 320/163 |
| 2013/0106199 A1* | 5/2013 | Forrest | ............ | G08C 17/02 307/113 |
| 2014/0159637 A1* | 6/2014 | Ebersold | ......... | H02J 7/0068 320/101 |
| 2016/0079783 A1* | 3/2016 | Phan | ............... | H02J 7/35 320/101 |
| 2017/0047739 A1* | 2/2017 | Berger | ............ | H02J 1/102 |
| 2018/0043861 A1* | 2/2018 | Kosugi | ......... | G06K 19/0704 |
| 2019/0310706 A1* | 10/2019 | Wang | ............ | H02J 7/32 |

OTHER PUBLICATIONS

Jan. 15, 2019, International Search Report issued in the International Patent Application No. PCT/JP2018/041540.
Apr. 29, 2021, the Extended European Search Report issued by the European Patent Office in the corresponding European Patent Application No. 18891264.6.

* cited by examiner

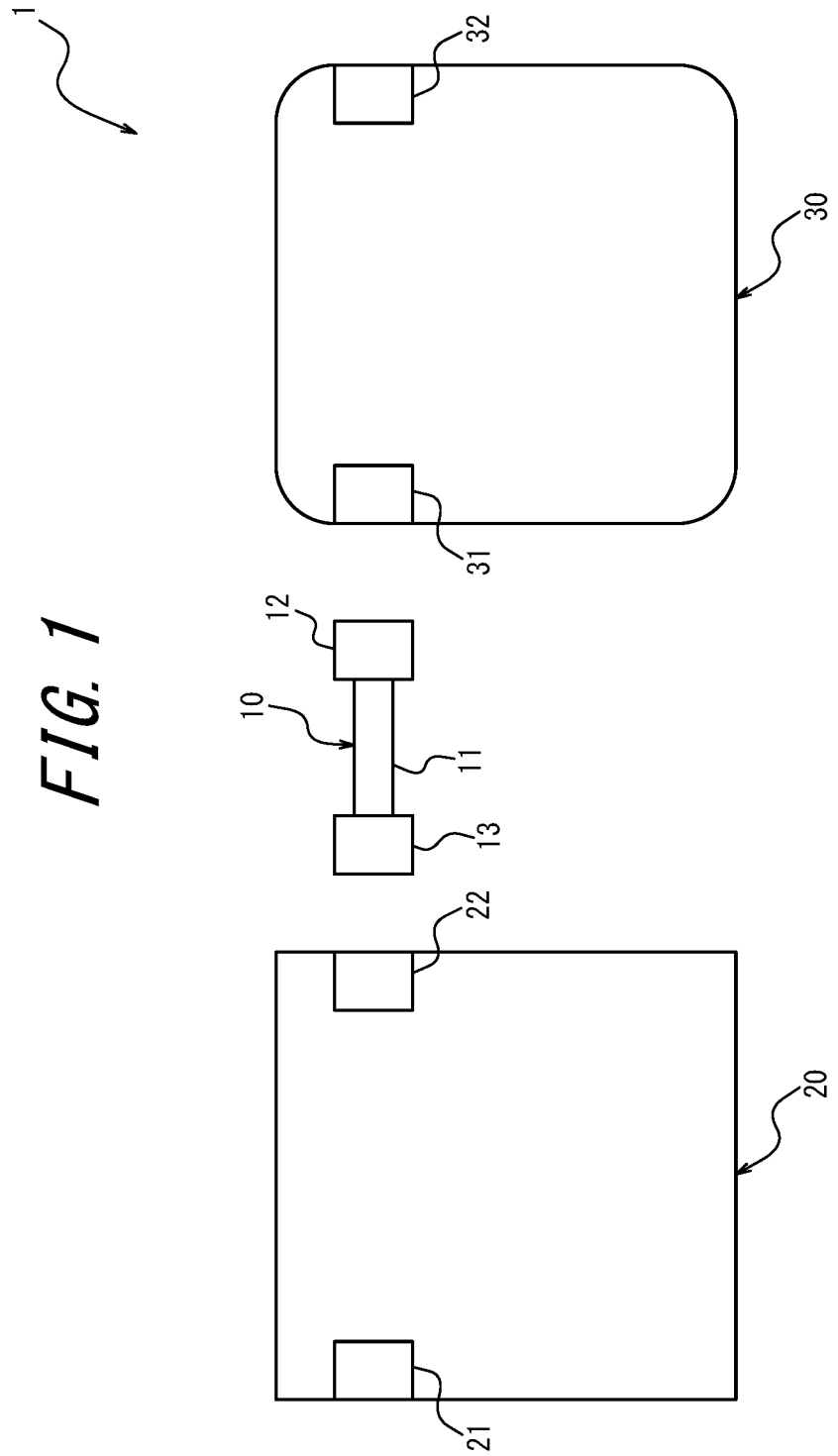

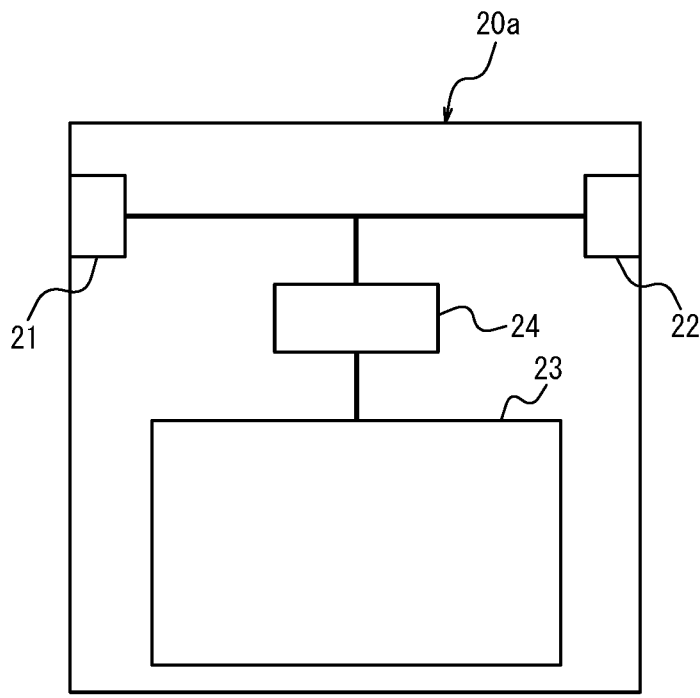
FIG. 2A
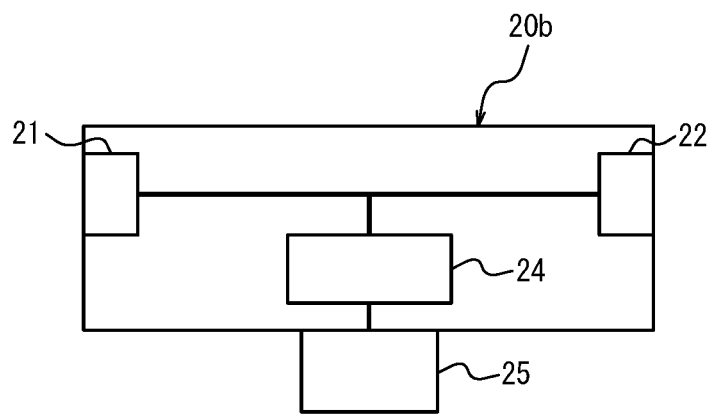
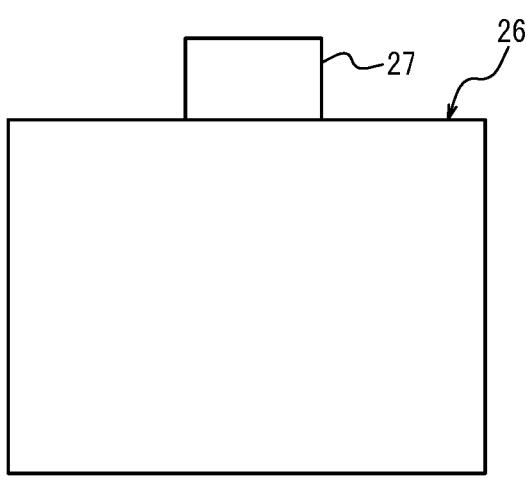
FIG. 2B

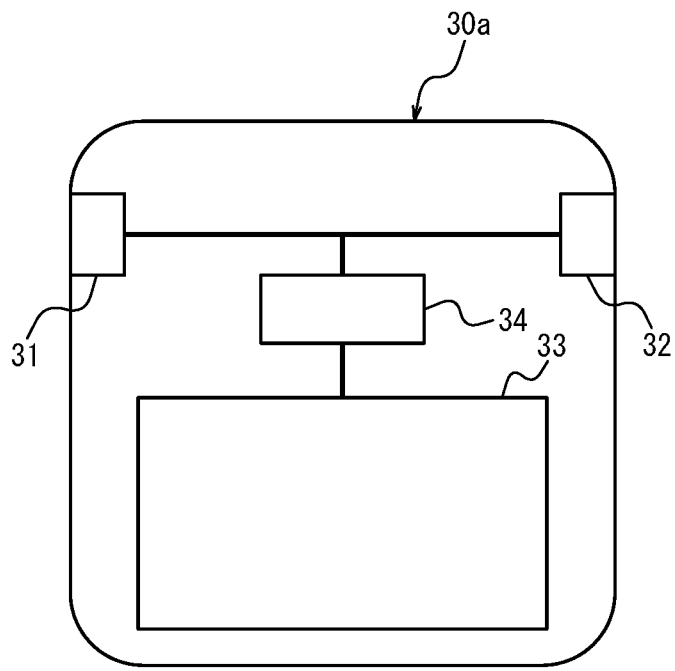
FIG. 3A
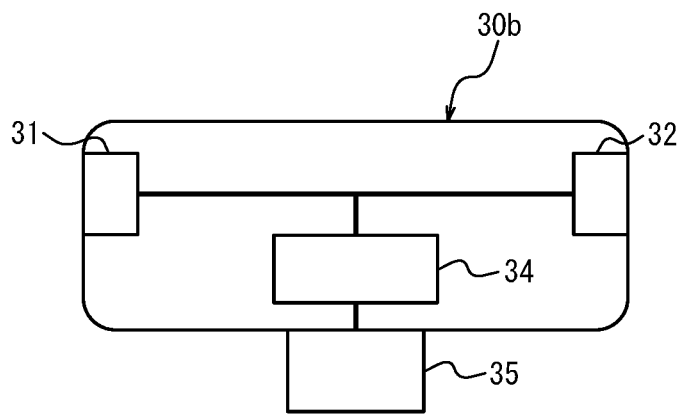
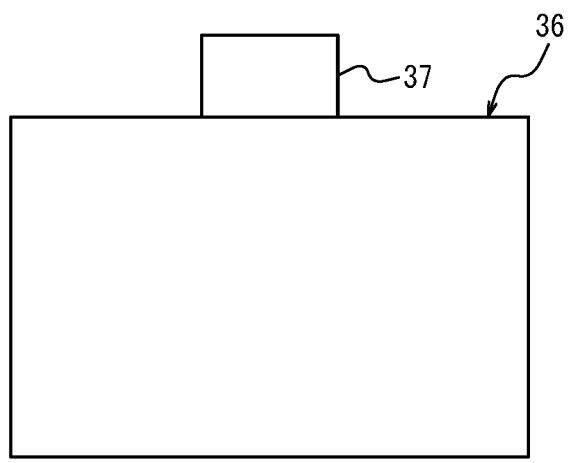
FIG. 3B

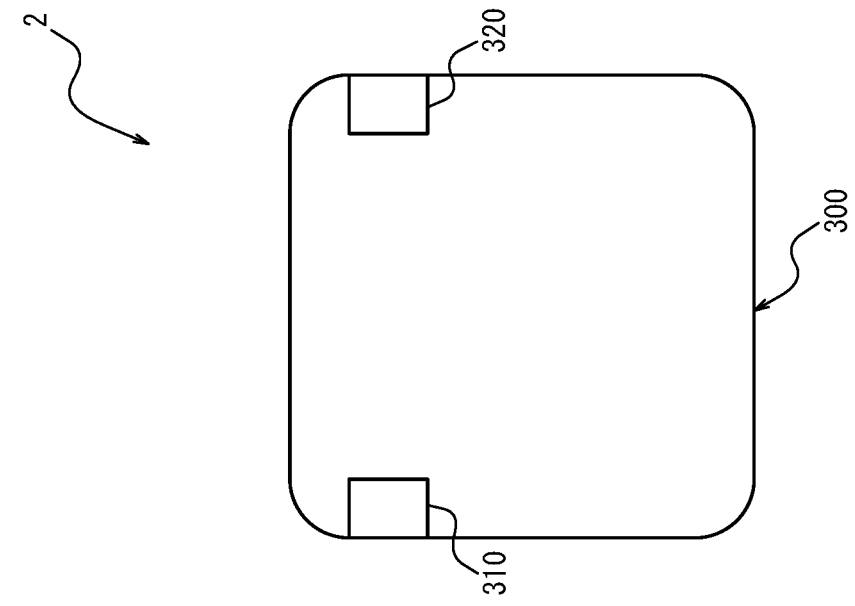
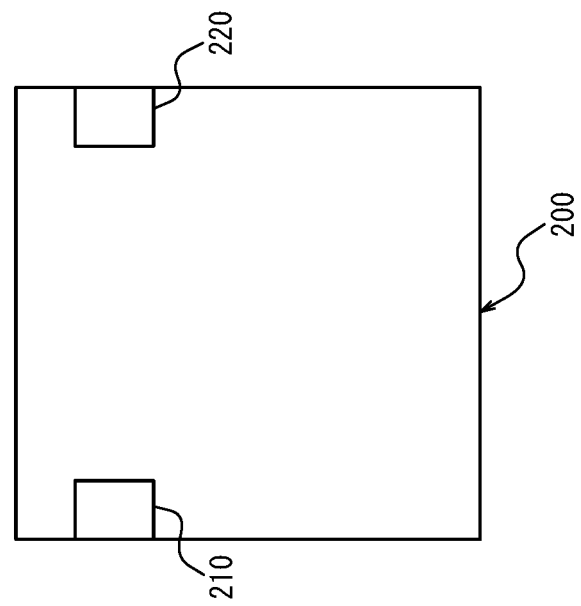
FIG. 9

POWER WIRING DEVICE

TECHNICAL FIELD

The present disclosure relates to a power wiring device.

BACKGROUND

In recent years, there has been growing demand for mobile energy harvesting devices that generate electric power in response to the external environment in order that a user can supply electric power to a load such as a smartphone, notebook PC (Personal Computer), tablet PC, or other mobile electronic device even when the user is out at a location where they do not have access to a commercial power supply. Examples of such energy harvesting devices include energy harvesting devices including solar cells that generate electricity using light energy such as sunlight and devices including thermoelectric elements that generate electricity using heat energy such as geothermal energy.

One example of an energy harvesting device such as described above is a solar cell module described in Patent Literature (PTL) 1 that can be formed by linking a plurality of modules to one another.

CITATION LIST

Patent Literature

PTL 1: Japanese Examined Utility Model (Registration) Application Publication No. S56-36144

SUMMARY

Technical Problem

In a situation in which electric power is to be supplied to a load using an energy harvesting device, one option is to construct a power wiring device in which an energy harvesting device (energy harvesting module) is connected to a load (load module) by a specific wiring member. When such a power wiring device is set up, it is desirable for the energy harvesting module to be arranged at a position where electricity generation efficiency is good. However, a position where electricity generation efficiency of the energy harvesting module is good can change over time due to external factors. For example, in a case in which a solar cell is used as the energy harvesting module, positions where light exposure is good and thus electricity generation efficiency is good and positions where light exposure is poor and thus electricity generation efficiency is poor change over time due to the time of day, the weather, and so forth of the external environment. Consequently, electricity generation efficiency of a power wiring device may decrease due to the external environment.

Accordingly, an objective of the present disclosure is to solve the problem set forth above and provide a power wiring device that can suppress reduction of electricity generation efficiency due to the external environment.

Solution to Problem

The present disclosure aims to advantageously solve the problem set forth above by disclosing a power wiring device comprising: a plurality of circuit modules each including a first connector and a second connector; and a wiring member including a third connector that is mechanically and electrically attachable to and detachable from the first connector and a fourth connector that is mechanically and electrically attachable to and detachable from the second connector, and in which the third connector and the fourth connector are electrically connected to one another, wherein the plurality of circuit modules includes: an energy harvesting module as a circuit module that can output, from the first connector and the second connector, electric power obtained through energy harvesting; and a load module as a circuit module that can consume electric power input from the first connector and electric power input from the second connector. By adopting such a configuration, a plurality of circuit modules including an energy harvesting module can be attached and detached in any arrangement. Therefore, reduction of electricity generation efficiency due to the external environment can be suppressed by attaching and detaching the energy harvesting module as appropriate in order to arrange the energy harvesting module at a position where electricity generation efficiency is good.

In the presently disclosed power wiring device, the energy harvesting module preferably includes or is connectable to an energy harvesting part that can generate electric power through energy harvesting. By adopting such a configuration, it is possible to incorporate an energy harvesting part into the energy harvesting module in advance or to connect a desired energy harvesting part to the energy harvesting module as necessary in the power wiring device.

In the presently disclosed power wiring device, the energy harvesting module preferably includes a reverse current preventing part that restricts current from flowing into the energy harvesting part from either or both of the first connector and the second connector. By adopting such a configuration, it is possible to restrict current from flowing into the energy harvesting part from another circuit module, for example, leading to malfunction or the like, even in a situation in which electric power supply from the energy harvesting part decreases.

In the presently disclosed power wiring device, the load module preferably includes or is connectable to a load that can consume electric power. By adopting such a configuration, it is possible to incorporate a load into the load module in advance or to connect a desired load to the load module as necessary in the power wiring device.

In the presently disclosed power wiring device, the load module preferably includes a voltage controlling part that controls, to a specific voltage, a voltage that is input from either or both of the first connector and the second connector and outputs the specific voltage to the load. By adopting such a configuration, the load module can control a voltage to a specific voltage that is suitable for the load and can then output the specific voltage to the load even when the input voltage is a voltage that is not suitable for the load.

It is preferable that the presently disclosed power wiring device comprises a plurality of the wiring member, wherein the plurality of circuit modules includes a plurality of the energy harvesting module. By adopting such a configuration, it is possible to increase the electric power that can be output to a circuit module such as the load module.

Moreover, it is preferable that the presently disclosed power wiring device comprises a plurality of the wiring member, wherein the plurality of circuit modules includes a plurality of the load module. By adopting such a configuration, it is possible to supply electric power simultaneously to a plurality of loads.

The presently disclosed power wiring device preferably further comprises a switching member including: a fifth connector that is mechanically and electrically attachable to and detachable from the third connector; a sixth connector that is mechanically attachable to and detachable from the fourth connector; and a switching part that can switch between electrical connection and electrical disconnection between the fifth connector and the sixth connector. By adopting such a configuration, it is possible to switch between electrical connection and electrical disconnection while maintaining a state in which a wiring member is mechanically connected to another wiring member via the switching part.

In the presently disclosed power wiring device, the switching part is preferably a switch element.

It is preferable that the presently disclosed power wiring device comprises a plurality of the wiring member, wherein the plurality of circuit modules includes a plurality of circuit module groups each including a plurality of circuit modules connected via one or more wiring members among the plurality of the wiring member, and at least two circuit module groups among the plurality of circuit module groups are connected to one another via the switching member. By adopting such a configuration, it is possible to switch between electrical connection and electrical disconnection between the plurality of circuit module groups that are mechanically connected via the switching part. Therefore, electric power can be preferentially supplied to a load module having high priority for electric power supply depending on electric power generated by the energy harvesting module.

The presently disclosed power wiring device preferably further comprises a branching member including: a fifth connector that is mechanically and electrically attachable to and detachable from the third connector; and a sixth connector that is mechanically and electrically attachable to and detachable from the fourth connector, and including at least one of the fifth connector and the sixth connector in plurality. By adopting such a configuration, three or more circuit module groups can be connected via a single branching member, thereby enabling a higher degree of freedom of arrangement.

In the presently disclosed power wiring device, the plurality of circuit modules preferably includes a secondary battery module as a circuit module that includes a secondary battery and that can switch between a charging state in which electric power input from either or both of the first connector and the second connector charges the secondary battery and a power supplying state in which electric power from the secondary battery is output from the first connector and the second connector. By adopting such a configuration, it is possible to stably supply electric power to the load module by switching the secondary battery module between the charging state and the power supplying state depending on the circumstances, such as by switching the secondary battery module to the power supplying state in a situation in which electric power supply to the load module is insufficient and switching the secondary battery module to the charging state in a situation in which electric power supply to the load module is sufficient, for example.

The present disclosure also aims to advantageously solve the problem set forth above by disclosing a power wiring device comprising a plurality of circuit modules each including: a first connector; and a second connector that is mechanically and electrically attachable to and detachable from the first connector, wherein the plurality of circuit modules includes: an energy harvesting module as a circuit module that can output, from the first connector and the second connector, electric power obtained through energy harvesting; and a load module as a circuit module that can consume electric power input from the first connector and electric power input from the second connector. By adopting such a configuration, it is possible to attach and detach a plurality of circuit modules including an energy harvesting module in any arrangement. Therefore, reduction of electricity generation efficiency due to the external environment can be suppressed by attaching and detaching the energy harvesting module as appropriate in order to arrange the energy harvesting module at a position where electricity generation efficiency is good.

Advantageous Effect

According to the present disclosure, it is possible to provide a power wiring device that can suppress reduction of electricity generation efficiency due to the external environment.

BRIEF DESCRIPTION OF THE DRAWINGS

In the accompanying drawings:

FIG. 1 is a schematic view of a power wiring device according to one embodiment of the present disclosure;

FIG. 2A is a schematic view illustrating a first example of configuration of an energy harvesting module included as a circuit module in the power wiring device illustrated in FIG. 1;

FIG. 2B is a schematic view illustrating a second example of configuration of an energy harvesting module included as a circuit module in the power wiring device illustrated in FIG. 1;

FIG. 3A is a schematic view illustrating a first example of configuration of a load module included as a circuit module in the power wiring device illustrated in FIG. 1;

FIG. 3B is a schematic view illustrating a second example of configuration of a load module included as a circuit module in the power wiring device illustrated in FIG. 1;

FIG. 9 is a schematic view of a modified example of the power wiring device illustrated in FIG. 1.

DETAILED DESCRIPTION

Figure 4:
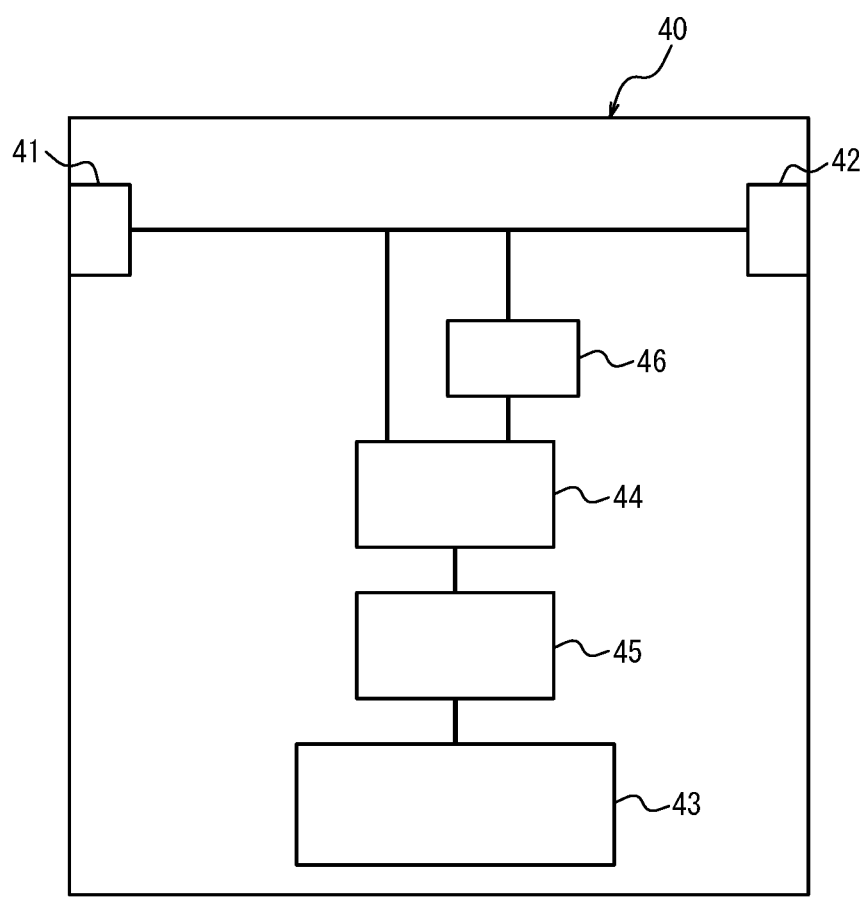
FIG. 4 is a schematic view illustrating an example of configuration of a secondary battery module included as a circuit module in the power wiring device illustrated in FIG. 1.

The following describes embodiments of the present disclosure with reference to the drawings. Note that parts of configuration that are common to each drawing are marked by the same reference sign.

[Configuration of Power Wiring Device 1]

FIG. 1 is a schematic view of a power wiring device 1 according to one embodiment of the present disclosure. As illustrated in FIG. 1, the power wiring device 1 includes a wiring member 10 and a plurality of circuit modules. The plurality of circuit modules includes at least an energy harvesting module 20 and a load module 30 as illustrated in FIG. 1. Each of the plurality of circuit modules includes a first connector (for example, a first connector 21 included in the energy harvesting module 20 or a first connector 31 included in the load module 30) and a second connector (for example, a second connector 22 included in the energy harvesting module 20 or a second connector 32 included in the load module 30) as described in detail further below. The circuit modules are electrically connected in parallel to one another through the wiring member 10. Note that in FIG. 1, the shapes of configurations of the power wiring device 1 are defined such as to facilitate description, and the shapes of configurations are not limited to these shapes. The same also applies for each of the drawings described below.

The wiring member 10 includes a conductive part 11, a third connector 12, and a fourth connector 13 as illustrated in FIG. 1. The wiring member 10 electrically connects the third connector 12 and the fourth connector 13 to one another. The wiring member 10 may include a covering part that covers the periphery of the conductive part 11.

The conductive part 11 is connected to the third connector 12 and the fourth connector 13. The conductive part 11 in the present embodiment has an elongated shape and allows electricity to pass along its entire length in an extension direction thereof. The conductive part 11 includes an electrical conductor. The electrical conductor included in the conductive part 11 is not specifically limited and may, for example, be an electrical conductor formed from a metal material selected from the group consisting of copper, aluminum, nickel, and iron, or an alloy material containing any of these metal materials. The conductive part 11 may be flexible such that it can be repeatedly folded at any position in the extension direction or may be rigid. From a viewpoint of making the shape of the wiring member 10 changeable and increasing the degree of freedom of set-up of the overall power wiring device 1, it is preferable that the conductive part 11 is flexible.

The third connector 12 is mechanically and electrically attachable to and detachable from the first connector. In other words, the third connector 12 is mechanically and electrically attachable to and detachable from the first connector included in any of the circuit modules among the plurality of circuit modules. When two connectors are referred to as "mechanically and electrically attachable and detachable" in the present specification, this means that one of the connectors can be attached to the other connector and can also be detached from an attached state. In a state in which one of the connectors is attached to the other connector, the two connectors are mechanically and electrically connected to one another. Moreover, in a state in which one of the connectors is detached from the other connector, the two connectors are mechanically and electrically disconnected from one another.

The fourth connector 13 is mechanically and electrically attachable to and detachable from the second connector. In other words, the fourth connector 13 is mechanically and electrically attachable to and detachable from the second connector included in any of the circuit modules among the plurality of circuit modules.

The third connector 12 and the fourth connector 13 are connected to the conductive part 11. Consequently, the third connector 12 and the fourth connector 13 are in continuity (i.e., are electrically connected to one another) through the conductive part 11. In the present embodiment, the third connector 12 is connected to one end of the conductive part 11 and the fourth connector 13 is connected to the other end of the conductive part 11.

Although no specific limitations are placed on the total length of the conductive part 11 of the wiring member 10 in the extension direction, it is preferable that the total length of the conductive part 11 in the extension direction is shorter than the total length along a straight line passing through the first connector 21 and the second connector 22 of the energy harvesting module 20 and the total length of a straight line passing through the first connector 31 and the second connector 32 of the load module 30 in terms that this can suppress an increase in the total length of the power wiring device 1. FIG. 1 illustrates an example in which the power wiring device 1 includes one wiring member 10, but the power wiring device 1 may include a plurality of wiring members 10.

The energy harvesting module 20 includes a first connector 21 and a second connector 22 as illustrated in FIG. 1. The energy harvesting module 20 can output, from the first connector 21 and the second connector 22, electric power obtained through energy harvesting. In the present embodiment, the first connector 21 is located at one end (left end in FIG. 1) of the energy harvesting module 20 and is attachable to and detachable from the third connector 12 of the wiring member 10 at a side of the first connector 21 corresponding to the one end (left side in FIG. 1). Moreover, the second connector 22 is located at the other end (right end in FIG. 1) of the energy harvesting module 20 and is attachable to and detachable from the fourth connector 13 of the wiring member 10 at a side of the second connector 22 corresponding to the other end (right side in FIG. 1).

FIG. 1 illustrates an example in which the power wiring device 1 includes one energy harvesting module 20, but the power wiring device 1 may include a plurality of energy harvesting modules 20. In a case in which the power wiring device 1 includes a plurality of energy harvesting modules 20, the electricity generating ability of each of the energy harvesting modules 20 may be the same or different.

FIG. 2A is a schematic view of an energy harvesting module 20a as a first example of configuration of the energy harvesting module 20. FIG. 2B is a schematic view of an energy harvesting module 20b as a second example of configuration of the energy harvesting module 20.

The energy harvesting module 20a that is a first example of configuration of the energy harvesting module 20 includes an energy harvesting part 23 and a reverse current preventing part 24 in addition to the previously described first connector 21 and second connector 22 as illustrated in FIG. 2A. The first connector 21, the second connector 22, and the reverse current preventing part 24 are electrically connected to one another via electrical wiring. The reverse current preventing part 24 and the energy harvesting part 23 are electrically connected to one another via electrical wiring. In other words, the first connector 21 and the second connector 22 are electrically connected to the energy harvesting part 23 via the reverse current preventing part 24. Note that parts of configuration that are electrically connected to one another in the energy harvesting module 20 may be directly connected to one another rather than being connected to one another via electrical wiring.

The energy harvesting part 23 can generate electric power through energy harvesting. In other words, the energy harvesting part 23 generates electric power in response to the external environment. Therefore, electric power generated by the energy harvesting part 23 changes depending on the external environment. The energy harvesting part 23 may, for example, include a solar cell that utilizes light energy such as sunlight or room light to generate electricity. Alternatively, the energy harvesting part 23 may include a thermoelectric element that utilizes heat energy such as geothermal energy to generate electricity. The energy harvesting part 23 outputs the generated electric power to the first connector 21 and the second connector 22 via the reverse current preventing part 24.

The energy harvesting part 23 of the present embodiment includes a solar cell panel including a solar cell. The solar cell panel is a member including a solar cell that performs photoelectric conversion of incident light such as sunlight or room light and outputs electric power. The type of solar cell included in the solar cell panel may be roughly classified as an inorganic solar cell in which an inorganic material is used or an organic solar cell in which an organic material is used. Examples of inorganic solar cells include silicon (Si) solar cells in which Si is used and compound solar cells in which a compound is used. Examples of organic solar cells include thin-film solar cells such as small molecule vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. Examples of solar cells that can be included in the solar cell panel also include organic/inorganic hybrid solar cells and solar cells in which a perovskite compound is used. The solar cell panel may have a thin panel shape and, in such a case, a dye-sensitized solar cell formed on a plastic film or the like is suitable in terms of ease of thin molding. Note that in a case in which the solar cell panel has a thin panel shape, the solar cell panel is not limited to being produced on a plastic film or the like as described above, and may of course be of any type so long as it is thin. In a case in which the solar cell panel has a thin panel shape, the thickness thereof may suitably be not less than 10 μm and not more than 3 mm, for example, from a viewpoint of production technology.

The reverse current preventing part 24 restricts current from following into the energy harvesting part 23 from the first connector 21 and/or the second connector 22. The reverse current preventing part 24 in this example restricts current from flowing into the energy harvesting part 23 from the first connector 21 and restricts current from flowing into the energy harvesting part 23 from the second connector 22. The reverse current preventing part 24 can include a circuit element such as a diode. In a case in which a diode is used as the reverse current preventing part 24, the diode is connected such that the anode thereof is at a side connected to the energy harvesting part 23 and the cathode thereof is at a side connected to the first connector 21 and the second connector 22. The reverse current preventing part 24 may be configured by connecting the collector and the base of a transistor, and using between them and the emitter as a diode.

The energy harvesting module 20b that is a second example of configuration of the energy harvesting module 20 includes a reverse current preventing part 24 and a connector for energy harvesting part connection 25 in addition to the previously described first connector 21 and second connector 22 as illustrated in FIG. 2B. The energy harvesting module 20b differs from the energy harvesting module 20a in terms that the energy harvesting module 20a includes an energy harvesting part 23 but the energy harvesting module 20b does not include an energy harvesting part 23.

The reverse current preventing part 24 included in the energy harvesting module 20b restricts current from flowing into the connector for energy harvesting part connection 25 from the first connector 21 and/or the second connector 22. Other aspects of configuration of the reverse current preventing part 24 included in the energy harvesting module 20b are the same as for the reverse current preventing part 24 included in the previously described energy harvesting module 20a.

The connector for energy harvesting part connection 25 is a connector that is mechanically and electrically connectable to an external energy harvesting part 26. The connector for energy harvesting part connection 25 may be mechanically and electrically attachable to and detachable from the external energy harvesting part 26. The connector for energy harvesting part connection 25 is not specifically limited and can be a connector in accordance with a specific standard such as a connector in which a USB (Universal Serial Bus) interface is used.

The external energy harvesting part 26 has the same configuration as the energy harvesting part 23 included in the previously described energy harvesting module 20a with the exception that the external energy harvesting part 26 includes a connector 27. The connector 27 is a connector that is mechanically and electrically connectable to the connector for energy harvesting part connection 25. In the same way as the connector for energy harvesting part connection 25, the connector 27 is not specifically limited and can be a connector in accordance with a specific standard such as a connector in which a USB interface is used.

The load module 30 includes a first connector 31 and a second connector 32 as illustrated in FIG. 1. The load module 30 can consume electric power input from the first connector 31 and electric power input from the second connector 32. In the present embodiment, the first connector 31 is located at one end (left end in FIG. 1) of the load module 30 and is attachable to and detachable from the third connector 12 of the wiring member 10 at a side of the first connector 31 corresponding to the one end (left side in FIG. 1). Moreover, the second connector 32 is located at the other end (right end in FIG. 1) of the load module 30 and is attachable to and detachable from the fourth connector 13 of the wiring member 10 at a side of the second connector 32 corresponding to the other end (right side in FIG. 1).

FIG. 1 illustrates an example in which the power wiring device 1 includes one load module 30, but the power wiring device 1 may include a plurality of load modules 30. In a case in which the power wiring device 1 includes a plurality of load modules 30, the power consumption of each of the load modules 30 may be the same or different.

FIG. 3A is a schematic view of a load module 30a as a first example of configuration of the load module 30. FIG. 3B is a schematic view of a load module 30b as a second example of configuration of the load module 30.

The load module 30a that is a first example of configuration of the load module 30 includes a load 33 and a voltage controlling part 34 in addition to the previously described first connector 31 and second connector 32 as illustrated in FIG. 3A. The first connector 31, the second connector 32, and the voltage controlling part 34 are electrically connected to one another via electrical wiring. The voltage controlling part 34 and the load 33 are electrically connected to one another via electrical wiring. In other words, the first connector 31 and the second connector 32 are electrically connected to the load 33 via the voltage controlling part 34. Note that parts of configuration that are electrically connected to one another in the load module 30 may be directly connected to one another rather than being connected to one another via electrical wiring.

The load 33 may be any load that can consume electric power. The load 33 may, for example, be LED lighting, an electronic device such as a radio, or the like. Electric power consumed by the load 33 can change depending on the state of actuation of the load 33, for example.

The voltage controlling part 34 controls a voltage input from the first connector 31 and/or the second connector 32 to a specific voltage and outputs the specific voltage to the load 33. More specifically, the voltage controlling part 34 raises or lowers a voltage input from the first connector 31 and/or the second connector 32 to a specific voltage suitable for actuation of the load 33, such as a rated voltage of the load 33, and outputs the specific voltage to the load 33. The voltage controlling part 34 in this example controls a voltage input from the first connector 31 and the second connector 32 to a specific voltage and outputs the specific voltage to the load 33.

The load module 30b that is a second example of configuration of the load module 30 includes a voltage controlling part 34 and a connector for load connection 35 in addition to the previously described first connector 31 and second connector 32 as illustrated in FIG. 3B.

The voltage controlling part 34 included in the load module 30b controls a voltage input from the first connector 31 and/or the second connector 32 to a specific voltage and outputs the specific voltage to the connector for load connection 35. More specifically, the voltage controlling part 34 raises or lowers a voltage input from the first connector 31 and/or the second connector 32 to a specific voltage, such as a rated voltage in accordance with a standard for the connector for load connection 35, and outputs the specific voltage to the connector for load connection 35. The voltage controlling part 34 in this example controls a voltage input from the first connector 31 and the second connector 32 to a specific voltage and outputs the specific voltage to the connector for load connection 35.

The connector for load connection 35 is a connector that is mechanically and electrically connectable to an external load 36. The connector for load connection 35 may be mechanically and electrically attachable to and detachable from the external load 36. The connector 35 for load connection is not specifically limited and can be a connector in accordance with a specific standard such as a connector in which a USB interface is used.

The external load 36 has the same configuration as the load 33 included in the previously described load module 30a with the exception that the external load 36 includes a connector 37. The connector 37 is a connector that is mechanically and electrically connectable to the connector for load connection 35. In the same way as the connector for load connection 35, the connector 37 is not specifically limited and can be a connector in accordance with a specific standard such as a connector in which a USB interface is used. The external load 36 is a load that is connectable to the connector for load connection 35 via the connector 37 and may, for example, be a typical electronic device such as a smartphone, a mobile phone, or a personal computer.

The power wiring device 1 may further include a secondary battery module as a circuit module. FIG. 4 is a schematic view illustrating a secondary battery module 40 as an example of configuration of a secondary battery module included as a circuit module in the power wiring device 1.

The secondary battery module 40 includes a first connector 41 and a second connector 42 as illustrated in FIG. 4. The first connector 41 is mechanically and electrically attachable to and detachable from the third connector 12 included in the wiring member 10 in the same way as the first connector 21 included in the energy harvesting module 20 and the first connector 31 included in the load module 30 illustrated in FIG. 1, etc. The second connector 42 is mechanically and electrically attachable to and detachable from the fourth connector 13 included in the wiring member 10 in the same way as the second connector 22 included in the energy harvesting module 20 and the second connector 32 included in the load module 30 illustrated in FIG. 1, etc. The power wiring device 1 may include a plurality of secondary battery modules 40. In a case in which the power wiring device 1 includes a plurality of secondary battery modules 40, the input electric power during charging and the output electric power during power supplying may be the same or different for each of the secondary battery modules 40.

The secondary battery module 40 includes a secondary battery 43, a switching part 44, a voltage controlling part 45, and a reverse current preventing part 46 in addition to the previously described first connector 41 and second connector 42 as illustrated in FIG. 4.

The secondary battery 43 is a secondary battery that is chargeable and dischargeable. The secondary battery 43 may, for example, be a lithium ion battery, a nickel-metal hydride battery, or the like.

The switching part 44 can switch between a charging state in which electric power input from the first connector 41 and/or the second connector 42 charges the secondary battery 43 and a power supplying state in which electric power from the secondary battery 43 is output from the first connector 41 and the second connector 42. The switching part 44 includes, for example, a switch element that is electrically connected to the secondary battery 43 and electrical wiring connected to the first connector 41 and the second connector 42, in-between the secondary battery 43 and the electrical wiring.

The voltage controlling part 45 controls a voltage input from the first connector 41 and/or the second connector 42 to a specific voltage and outputs the specific voltage to the secondary battery 43. More specifically, the voltage controlling part 45 raises or lowers a voltage input from the first connector 41 and/or the second connector 42 to a specific voltage suitable for charging the secondary battery 43, such as a rated voltage of the secondary battery 43, and outputs the specific voltage to the secondary battery 43. Moreover, the voltage controlling part 45 controls a voltage input from the secondary battery 43 to a specific voltage and outputs the specific voltage to the first connector 41 and the second connector 42. More specifically, the voltage controlling part 45 raises or lowers the voltage of electric power input from the secondary battery 43 to a specific voltage suitable for another circuit module such as the load module 30, and outputs the specific voltage to the first connector 41 and the second connector 42. The voltage controlling part 45 is electrically connected to the switching part 44 and the secondary battery 43, in-between the switching part 44 and the secondary battery 43.

In a situation in which the switching part 44 is in the power supplying state, the reverse current preventing part 46 restricts current from flowing into the secondary battery 43 from the first connector 41 and/or the second connector 42. The reverse current preventing part 46 in this example restricts current from flowing into the secondary battery 43 from the first connector 41 and restricts current from flowing into the secondary battery 43 from the second connector 42. The reverse current preventing part 46 can include a circuit element such as a diode. In a case in which a diode is used as the reverse current preventing part 46, the diode is connected such that the anode thereof is at a side connected to the secondary battery 43 and the cathode thereof is at a side connected to the first connector 41 and the second connector 42. The reverse current preventing part 46 is positioned on wiring along which current flows when the switching part 44 is in the power supplying state and along which current does not flow when the switching part 44 is in the charging state.

When the power wiring device 1 includes the secondary battery module 40 as described above, this enables stable supply of electric power to the load module 30 by switching the secondary battery module 40 between the charging state and the power supplying state depending on the circumstances, such as by switching the secondary battery module 40 to the power supplying state in a situation in which electric power supply to the load module 30 is insufficient and switching the secondary battery module 40 to the charging state in a situation in which electric power supply to the load module 30 is sufficient, for example.

[First State of Use]

Figure 5:
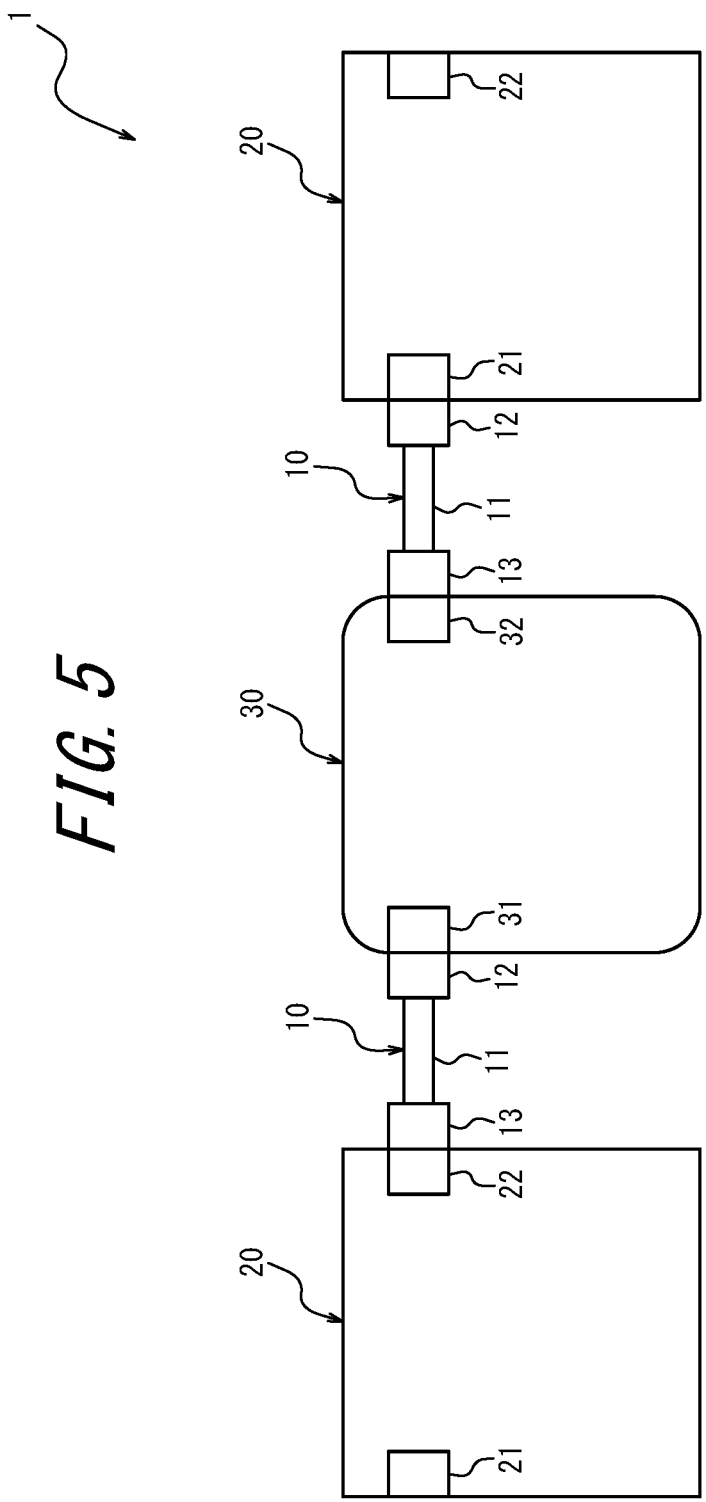
FIG. 5 illustrates a first state of use of the power wiring device illustrated in FIG. 1.

FIG. 5 illustrates a first state of use of the power wiring device 1. In this state of use, the power wiring device 1 includes two wiring members 10, two energy harvesting modules 20, and one load module 30 as illustrated in FIG. 5. More specifically, in the power wiring device 1 in this state of use, the two energy harvesting modules 20 are connected to the one load module 30 via the two wiring members 10. In the example illustrated in FIG. 5, the one load module 30 has one of the two energy harvesting modules 20 (energy harvesting module 20 at the left side in FIG. 5) electrically connected to the first connector 31 thereof and the other of the energy harvesting modules 20 (energy harvesting module 20 at the right side in FIG. 5) electrically connected to the second connector 32 thereof.

By providing a plurality of energy harvesting modules 20 for a single load module 30 as in this state of use, the load module 30 can be supplied with the electric power required thereby even if the required electric power cannot be supplied to the load module 30 by a single energy harvesting module 20.

[Second State of Use]

Figure 6:
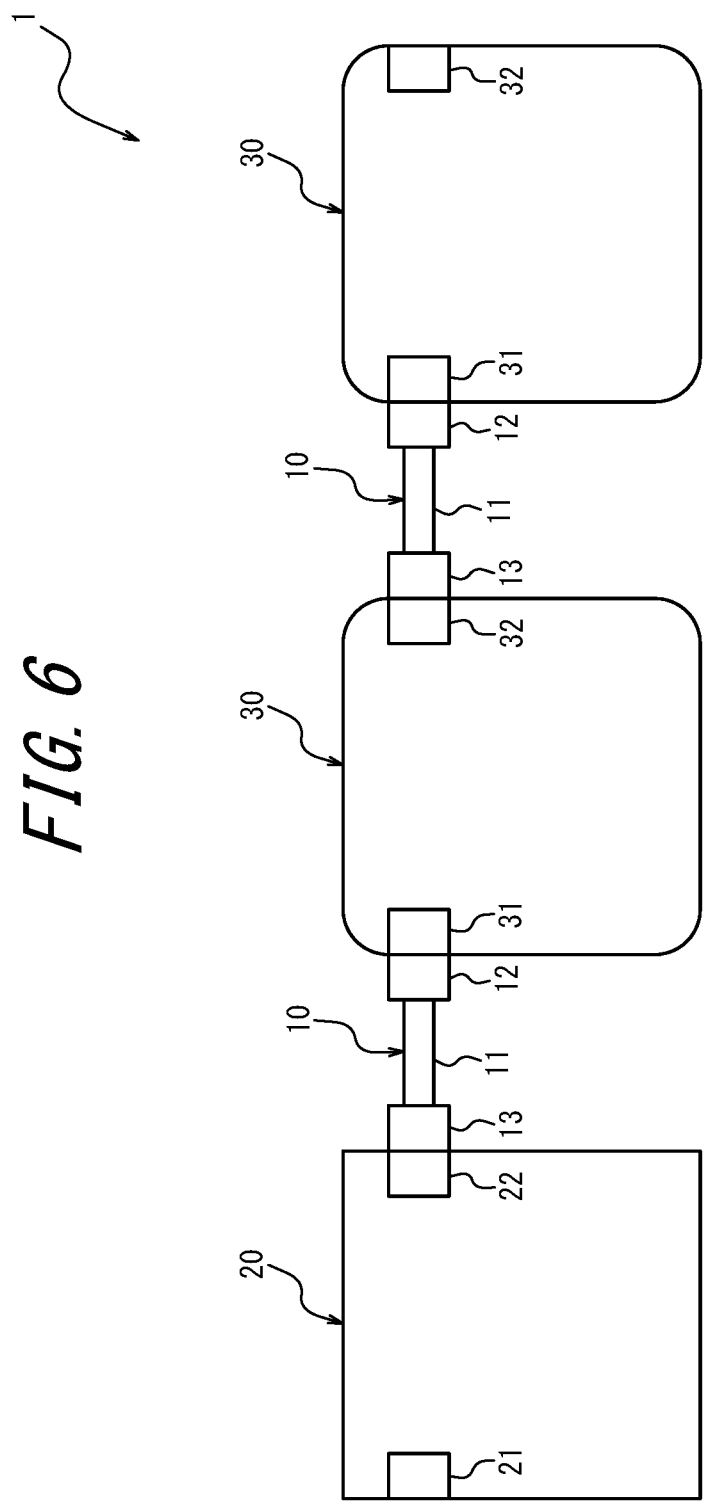
FIG. 6 illustrates a second state of use of the power wiring device illustrated in FIG. 1.

FIG. 6 illustrates a second state of use of the power wiring device 1. In this state of use, the power wiring device 1 includes two wiring members 10, one energy harvesting module 20, and two load modules 30 as illustrated in FIG. 6. More specifically, in the power wiring device 1 in this state of use, the two load modules are connected to the one energy harvesting module 20 via the two wiring members 10. In the example illustrated in FIG. 6, the one energy harvesting module 20 has the two load modules 30 electrically connected to the second connector 22 thereof.

By providing a plurality of load modules 30 for a single energy harvesting module 20 as in this state of use, electric power can be simultaneously supplied to the plurality of load modules 30 when sufficient electric power is generated by the energy harvesting module 20. Note that even in a case in which the respective loads 33 of the load modules 30 (refer to FIG. 3A) or the external loads 36 to which the load modules 30 respectively connect (refer to FIG. 3B) require different voltages for operation, voltage control is performed as appropriate by the voltage controlling part 34 included in each of the load modules 30, which enables operation of the plurality of load modules 30 through the shared energy harvesting module 20.

Moreover, a user can freely arrange circuit modules in accordance with any state of use, inclusive of the first state of use and the second state of use described above, and thus can freely construct an arrangement that is suitable for the state of use. Therefore, reduction of electricity generation efficiency due to the external environment can be suppressed by attaching and detaching an energy harvesting module 20 as appropriate in order to arrange the energy harvesting module 20 at a position where electricity generation efficiency is good. Moreover, a load module 30 can be attached and detached as appropriate in order to arrange the load module 30 at a position that is suitable for use thereof.

[Third State of Use]

Figure 7:
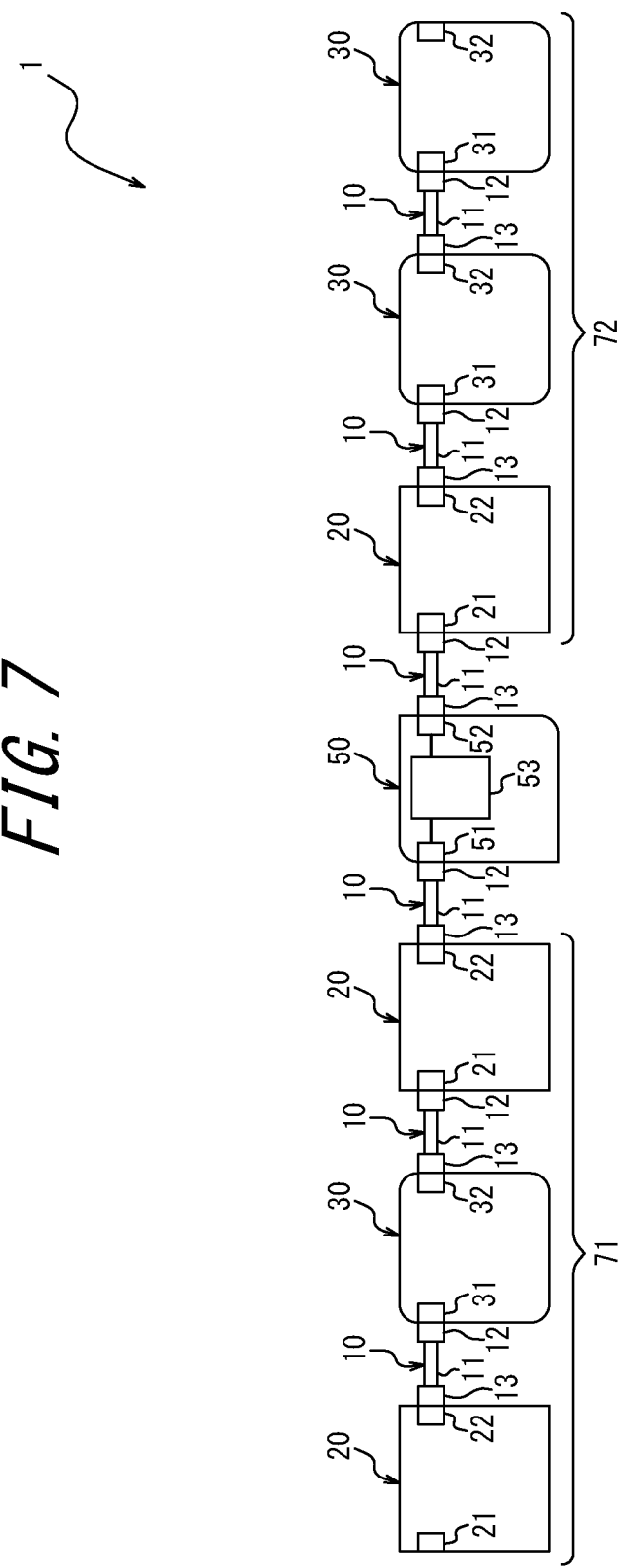
FIG. 7 illustrates a third state of use of the power wiring device illustrated in FIG. 1.

FIG. 7 illustrates a third state of use of the power wiring device 1. As illustrated in FIG. 7, the power wiring device 1 further includes a switching member 50.

The switching member 50 includes a fifth connector 51, a sixth connector 52, and a switching part 53. The fifth connector 51 is a connector that is mechanically and electrically attachable to and detachable from the third connector 12 included in the wiring member 10. The sixth connector 52 is a connector that is mechanically and electrically attachable to and detachable from the fourth connector 13 included in the wiring member 10. The switching part 53 can switch between electrical connection and electrical disconnection between the fifth connector 51 and the sixth connector 52. The switching part 53 includes, for example, a switch element that is electrically connected to the fifth connector 51 and the sixth connector 52, in-between the fifth connector 51 and the sixth connector 52. Note that the switching part 53 may, for example, switch between electrical connection and electrical disconnection between the fifth connector 51 and the sixth connector 52 for electric power supply by direct current electric power and may maintain electrical connection between the fifth connector 51 and the sixth connector 52 for signal transmission by alternating current electric power.

The plurality of circuit modules included in the power wiring device 1 in this state of use includes a plurality of circuit module groups that each include a plurality of circuit modules connected via one or more wiring members 10 as illustrated in FIG. 7. More specifically, the power wiring device 1 in this state of use includes a first circuit module group 71 including two energy harvesting modules 20 and one load module 30 that are connected via two wiring members 10 and a second circuit module group 72 including one energy harvesting module 20 and two load modules 30 that are connected via two wiring members 10. The first circuit module group 71 and the second circuit module group 72 are connected to one another via the switching member 50. In the example illustrated in FIG. 7, one of the two energy harvesting modules 20 of the first circuit module group 71 (energy harvesting module 20 at the right side in FIG. 7) is connected to the fifth connector 51 of the switching member 50 via a wiring member 10. Moreover, the energy harvesting module 20 of the second circuit module group 72 is connected to the sixth connector 52 of the switching member 50 via a wiring member 10.

When at least two circuit module groups among a plurality of circuit module groups each including a plurality of circuit modules are mechanically connected via a switching member 50 as in this state of use, it is possible to switch between electrical connection and electrical disconnection between the circuit module groups through switching of the switching part 53 of the switching member 50. Therefore, in a case in which it is desirable to preferentially supply electric power to the load module 30 included in the first circuit module group 71, for example, the switching part 53 can switch to disconnection when electric power supply of the energy harvesting modules 20 included in the first circuit module group 71 is sufficient, and thus electric power can be supplied to the load module 30 included in the first circuit module group 71, and the switching part 53 can switch to connection when electric power supply of the energy harvesting modules 20 included in the first circuit module group 71 is insufficient, and thus electric power can be supplied to the load module 30 included in the first circuit module group 71 from the energy harvesting module 20 included in the second circuit module group 72. In this manner, electric power can be supplied preferentially to a load module 30 having high priority for electric power supply depending on the electric power generated by energy harvesting modules 20.

[Fourth State of Use]

Figure 8:
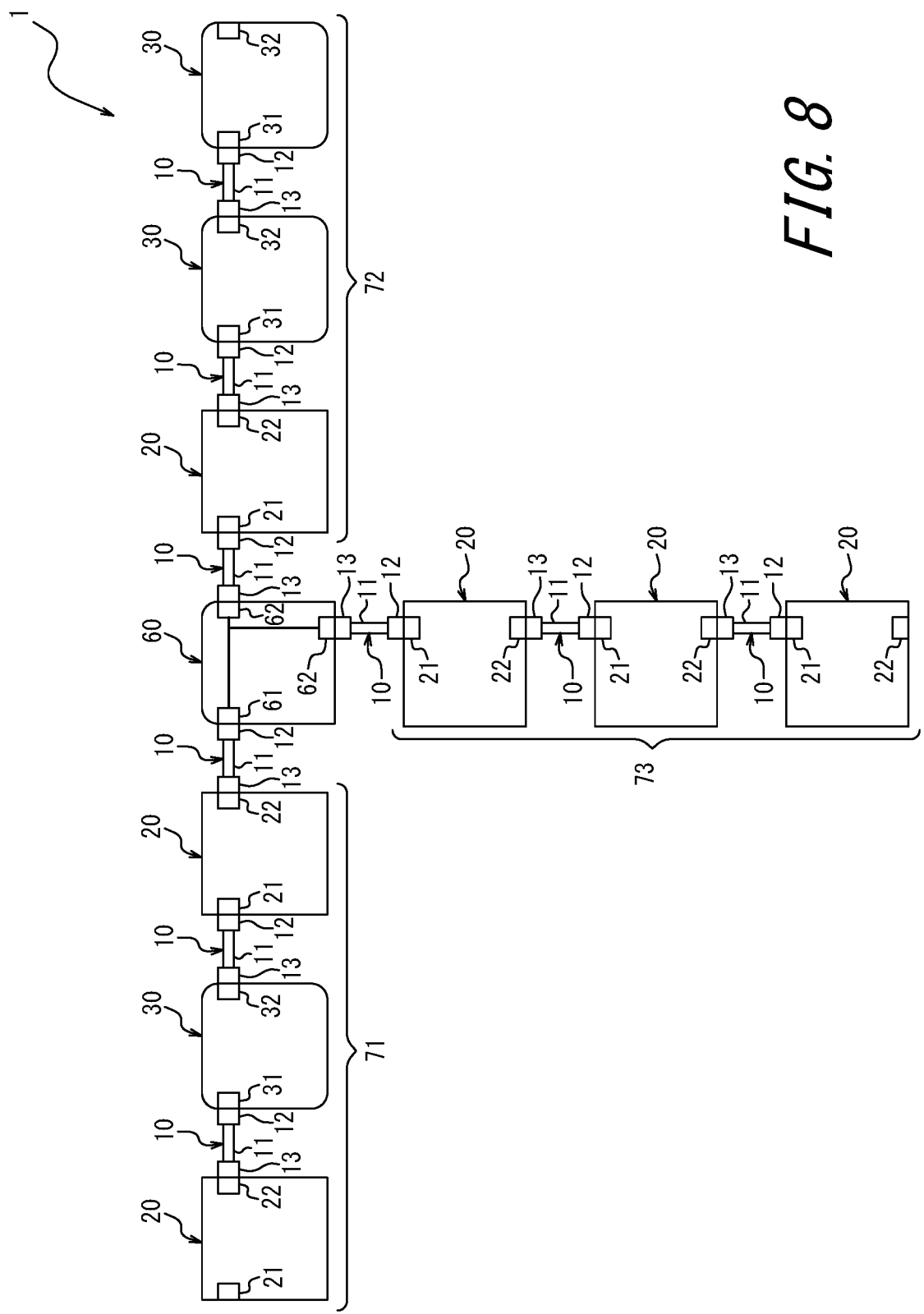
FIG. 8 illustrates a fourth state of use of the power wiring device illustrated in FIG. 1.

FIG. 8 illustrates a fourth state of use of the power wiring device 1. As illustrated in FIG. 8, the power wiring device 1 further includes a branching member 60.

The branching member 60 includes one fifth connector 61 and two sixth connectors 62. The fifth connector 61 is a connector that is mechanically and electrically attachable to and detachable from the third connector 12 of the wiring member 10. The sixth connectors 62 are connectors that are each mechanically and electrically attachable to and detachable from the fourth connector 13 of the wiring member 10. All of the connectors included in the branching member 60 (i.e., the one fifth connector 61 and the two sixth connectors) are electrically connected to one another.

The plurality of circuit modules included in the power wiring device 1 in this state of use includes three circuit module groups as illustrated in FIG. 8. More specifically, the power wiring device 1 in this state of use includes a first circuit module group 71, a second circuit module group 72, and a third circuit module group 73. The first circuit module group 71 and the second circuit module group 72 in this state of use are the same as the first circuit module group 71 and the second circuit module group 72 in the third state of use that was previously described with reference to FIG. 7, and thus description thereof is omitted. The third circuit module group 73 includes three energy harvesting modules 20 that are connected via two wiring members 10. The first circuit module group 71, the second circuit module group 72, and the third circuit module group 73 are connected to one another via the branching member 60. In the example illustrated in FIG. 8, one of the two energy harvesting modules 20 of the first circuit module group 71 (energy harvesting module 20 at the right side in FIG. 8) is connected to the fifth connector 61 of the branching member 60 via a wiring member 10. Moreover, the energy harvesting module 20 of the second circuit module group 72 is connected to one of the two sixth connectors 62 of the branching member 60 (sixth connector 62 at the right side in FIG. 8) via a wiring member 10. Furthermore, one of the three energy harvesting modules 20 of the third circuit module group 73 (energy harvesting module 20 at the upper side in FIG. 8) is connected to the other of the two sixth connectors 62 of the branching member 60 (sixth connector 62 at the lower side in FIG. 8) via a wiring member 10.

As a result of three circuit module groups being mechanically and electrically connectable via one branching member 60 as in this state of use, the degree of freedom of arrangement can be increased.

The preceding description merely illustrates an embodiment of the present disclosure and it goes without saying that various alterations can be made within the scope of the claims.

For example, although no specific limitations are placed on the shapes of two connectors (among the connectors described above) that are attachable and detachable with respect to one another, one of the two connectors may be a male connector and the other of the two connectors may be a female connector, for example. In a case in which the third connector 12 is a male connector, the first connector (for example, the first connectors 21, 31, and 41) and the fifth connector (for example, the fifth connectors 51 and 61) that are attachable to and detachable from the third connector 12 may each be a female connector. On the other hand, in a case in which the third connector 12 is a female connector, the first connector and the fifth connector that are attachable to and detachable from the third connector 12 may each be a male connector. In a case in which the fourth connector 13 is a male connector, the second connector (for example, the second connectors 22, 32, and 42) and the sixth connector (for example, the sixth connectors 52 and 62) that are attachable to and detachable from the fourth connector 13 may each be a female connector. On the other hand, in a case in which the fourth connector 13 is a female connector, the second connector and the sixth connector that are attachable to and detachable from the fourth connector 13 may each be a male connector.

Moreover, it is not essential that an energy harvesting module 20 includes a reverse current preventing part 24. However, when an energy harvesting module 20 includes a reverse current preventing part 24, this is preferable in terms of making it possible to restrict current from flowing into an energy harvesting part 23 or an external energy harvesting part 26 from another circuit module such as an energy harvesting module 20. Moreover, an energy harvesting module 20 may include a voltage controlling part that controls output voltage to a constant level.

It is also not essential that a load module 30 includes a voltage controlling part 34. However, when a load module 30 includes a voltage controlling part 34, this is preferable in terms of making it possible to inhibit electric power from a circuit module such as an energy harvesting module 20 being input to a load 33 or external load 36 in excess of the rated voltage, for example.

Moreover, it is not essential that a secondary battery module 40 includes a voltage controlling part 45. However, when a secondary battery module 40 includes a voltage controlling part 45, this is preferable in terms of enabling control of the voltage of electric power input to and output from the secondary battery 43.

Furthermore, it is not essential that a secondary battery module 40 includes a reverse current preventing part 46. However, when a secondary battery module 40 includes a reverse current preventing part 46, this is preferable in terms of making it possible to restrict current from flowing into a secondary battery 43 from another circuit module such as an energy harvesting module 20 in a situation in which a switching part 44 is in a power supplying state.

Although the branching member 60 was described as including one fifth connector 61 and two sixth connectors 62, the branching member 60 is not limited to such a configuration and should include at least one of the fifth connector 61 and the sixth connector 62 in plurality.

FIG. 9 is a schematic view of a power wiring device 2 as a modified example of the power wiring device 1 according to the present embodiment. As illustrated in FIG. 9, the power wiring device 2 includes a plurality of circuit modules. The plurality of circuit modules includes at least an energy harvesting module 200 and a load module 300 as illustrated in FIG. 9. Each of the circuit modules includes a first connector (for example, a first connector 210 included in the energy harvesting module 200 or a first connector 310 included in the load module 300) and a second connector (for example, a second connector 220 included in the energy harvesting module 200 or a second connector 320 included in the load module 300). The second connector is mechanically and electrically attachable to and detachable from the first connector. The power wiring device 2 is the same as the previously described power wiring device 1 with the exception that the first connector and the second connector are mechanically and electrically attachable and detachable and that it is not essential that the power wiring device 2 includes a wiring member.

As described above, the power wiring device 2 enables attachment and detachment of the plurality of circuit modules including the energy harvesting module 200 in any arrangement in the same way as the power wiring device 1. Therefore, reduction of electricity generation efficiency due to the external environment can be suppressed by attaching and detaching the energy harvesting module 200 as appropriate in order to arrange the energy harvesting module 200 at a position where electricity generation efficiency is good. Moreover, since circuit modules can be directly attached to and detached from one another without a wiring member in the power wiring device 2, the power wiring device 2 enables simpler arrangement and rearrangement of circuit modules.

INDUSTRIAL APPLICABILITY

According to the present disclosure, it is possible to provide a power wiring device that can suppress reduction of electricity generation efficiency due to the external environment.

REFERENCE SIGNS LIST 1, 2 power wiring device
10 wiring member
11 conductive part
12 third connector
13 fourth connector
20, 20a, 20b energy harvesting module
21 first connector
22 second connector
23 energy harvesting part
24 reverse current preventing part
25 connector for energy harvesting part connection
26 external energy harvesting part
27 connector
30, 30a, 30b load module
31 first connector
32 second connector
33 load
34 voltage controlling part
35 connector for load connection
36 external load
37 connector
40 secondary battery module
41 first connector
42 second connector
43 secondary battery
44 switching part
45 voltage controlling part
46 reverse current preventing part
50 switching member
51 fifth connector
52 sixth connector
53 switching part
60 branching member
61 fifth connector
62 sixth connector
71 first circuit module group
72 second circuit module group
73 third circuit module group
200 energy harvesting module
210 first connector
220 second connector
300 load module
310 first connector
320 second connector

The invention claimed is:

1. A power wiring device comprising:
   a plurality of circuit modules each including a first connector and a second connector; and
   a wiring member including a third connector that is mechanically and electrically attachable to and detachable from the first connector of one of the plurality of circuit modules and a fourth connector that is mechanically and electrically attachable to and detachable from the second connector of another one of the plurality of circuit modules, and in which the third connector and the fourth connector are electrically connected to one another, wherein
   the plurality of circuit modules includes:
   an energy harvesting module as a circuit module that can output, from the first connector and the second connector, electric power obtained through energy harvesting; and
   a load module as a circuit module that can consume electric power input from the first connector and electric power input from the second connector,
   wherein the power wiring device further comprises a switching member including: a fifth connector that is mechanically and electrically attachable to and detachable from the third connector; a sixth connector that is mechanically attachable to and detachable from the fourth connector; and a switching part that can switch between electrical connection and electrical disconnection between the fifth connector and the sixth connector.

2. The power wiring device according to claim 1, wherein the energy harvesting module includes or is connectable to an energy harvesting part that can generate electric power through energy harvesting.

3. The power wiring device according to claim 2, wherein the energy harvesting module includes a reverse current preventing part that restricts current from flowing into the energy harvesting part from either or both of the first connector and the second connector.

4. The power wiring device according to claim 1, wherein the load module includes or is connectable to a load that can consume electric power.

5. The power wiring device according to claim 4, wherein the load module includes a voltage controlling part that controls, to a specific voltage, a voltage that is input from either or both of the first connector and the second connector and outputs the specific voltage to the load.

6. The power wiring device according to claim 1, comprising a plurality of the wiring member, wherein
   the plurality of circuit modules includes a plurality of the energy harvesting module.

7. The power wiring device according to claim 1, comprising a plurality of the wiring member, wherein
   the plurality of circuit modules includes a plurality of the load module.

8. The power wiring device according to claim 1, wherein the switching part is a switch element.

9. The power wiring device according to claim 1, comprising a plurality of the wiring member, wherein the plurality of circuit modules includes a plurality of circuit module groups each including a plurality of circuit modules connected via one or more wiring members among the plurality of the wiring member, and at least two circuit module groups among the plurality of circuit module groups are connected to one another via the switching member.

10. The power wiring device according to claim 1, further comprising a branching member including: a fifth connector that is mechanically and electrically attachable to and detachable from the third connector; and a sixth connector that is mechanically and electrically attachable to and detachable from the fourth connector, and including at least one of the fifth connector and the sixth connector in plurality.

11. The power wiring device according to claim 1, wherein the plurality of circuit modules includes a secondary battery module as a circuit module that includes a secondary battery and that can switch between a charging state in which electric power input from either or both of the first connector and the second connector charges the secondary battery and a power supplying state in which electric power from the secondary battery is output from the first connector and the second connector.

* * * * *